United States Patent
Racine et al.

(10) Patent No.: US 6,582,014 B1
(45) Date of Patent: Jun. 24, 2003

(54) SUNROOF MECHANISM AND A RAIL ASSEMBLY FOR THE SAME

(75) Inventors: Lloyd George Racine, Shelby Township, MI (US); Edward Kiell, Niles, MI (US); Heather Bautz, Macomb, MI (US)

(73) Assignee: Webasto Sunroofs, Inc., Rochester Hills, MI (US)

( * ) Notice: Subject to any disclaimer, the term of this patent is extended or adjusted under 35 U.S.C. 154(b) by 0 days.

(21) Appl. No.: 10/199,103

(22) Filed: Jul. 22, 2002

(51) Int. Cl.$^7$ ................................................. B60J 7/047
(52) U.S. Cl. ................................. 296/223; 296/216.08
(58) Field of Search ........................... 296/223, 216.08

(56) References Cited

U.S. PATENT DOCUMENTS

| | | |
|---|---|---|
| 4,056,274 A | 11/1977 | Jardin et al. |
| 4,062,636 A | 12/1977 | Jardin et al. |
| 4,332,416 A | 6/1982 | Lutz et al. |
| 4,632,449 A | 12/1986 | Masuda |
| 4,671,565 A | 6/1987 | Grimm et al. |
| 4,705,316 A | 11/1987 | Jardin et al. |
| 4,749,227 A | 6/1988 | Bienert et al. |
| 4,883,311 A | 11/1989 | Kohlpaintner et al. |
| 5,020,850 A | 6/1991 | Bienert et al. |
| 5,104,178 A * | 4/1992 | Bienert ........................ 296/223 |
| 5,188,420 A | 2/1993 | Maeda et al. |
| 5,228,743 A | 7/1993 | Regner |
| 5,257,849 A | 11/1993 | Cheron et al. |
| 5,335,961 A | 8/1994 | Reinsch et al. |
| 5,466,038 A | 11/1995 | Fujie et al. |
| 5,612,600 A | 3/1997 | Bratkowski et al. |
| 6,024,404 A | 2/2000 | Stallfort et al. |
| 6,129,413 A | 10/2000 | Klein |
| 6,224,146 B1 | 5/2001 | Willard et al. |
| 6,305,740 B1 | 10/2001 | Staser et al. |

FOREIGN PATENT DOCUMENTS

| | | | | |
|---|---|---|---|---|
| DE | 2029318 | * | 1/1971 | ................. 296/223 |
| DE | 3532103 | * | 3/1987 | ................. 296/223 |
| DE | 4422646 | | 8/1995 | |
| FR | 2771970 | | 6/1999 | |

* cited by examiner

*Primary Examiner*—Dennis H. Pedder
(74) *Attorney, Agent, or Firm*—Pillsbury Winthrop LLP

(57) ABSTRACT

A sunroof mechanism for a vehicle includes track members mounted to the roof at side edge portions of an opening in the vehicle roof. The sunroof mechanism also includes a sunroof panel moveable with respect to the opening in the roof between various operative positions. The track members each have a drive member receiving channel with a longitudinally extending opening. A rail assembly is coupled to the track members at end portions thereof and extends therebetween. Drive members are coupled to the rail assembly and are received within guide sheaths and the channels such that the sheaths and the channels each guide the drive members for axial movement therein. Portions of the guide sheaths are received in guide sheath receiving portions provided by the track members in axially spaced relation from the receiving channels. The axially spaced relation enables the guide sheaths to axially elongate due to thermal expansion.

11 Claims, 9 Drawing Sheets

SUNROOF MECHANISM AND A RAIL ASSEMBLY FOR THE SAME

BACKGROUND OF THE INVENTION

1. Field of the Invention

The present invention relates to sunroof mechanisms for vehicles and, more particularly, to a structural rail for such sunroof mechanisms.

2. Description of Related Art

Existing sunroof mechanisms for vehicles, such as cars, trucks, vans and sport-utility vehicles, typically include a sunroof panel that is movable with respect to an opening in a roof of the vehicle. Generally, the sunroof panel is mounted on a pair of track members that extend along an edge of the roof opening. A structural rail may be provided in cooperating relation with the track members to provide attachment points for the tracks and to mount a motor for moving the sunroof panel. Such sunroof mechanisms also may include a drive mechanism, such as a motor that drives a plurality of drive cables, to move a sunroof panel into the different operative positions thereof. In some known sunroof mechanisms, the drive cables are received within elongated metal tubes welded or bolted to the structural rail. The metal tubes act as an outer sheath, similarly to the outer sheath of a Bowden wire, and provides a pathway for the drive cables. Specifically, the internal diameters of the metal tubes are essentially the same as the outer diameters of the drive cables so that the cables, when driven, only move linearly within the metal tubes.

The drive cables may be subject to thermal expansion during increased temperatures. Because the internal diameters of the tubes are matched closely with the outer diameters of the cables, the cables cannot flex within the tubes to accommodate for this thermal expansion. Thus, the cables expand in the only direction permitted—the axial linear direction within the tubes. This is problematic because such expansion can interfere with operation of the sunroof mechanism, particularly in those where sensors measure sunroof travel based on factors directly or indirectly effected by the cable travel.

In another type of sunroof shown in German Patent DE 4422646, a plurality of tabs are punched from the structural rail to define a pair of pathways for receiving the cable. Specifically, the internal surfaces of the tabs define pathways for the cables. The cables are unsheathed and inserted in these pathways so that the tabs themselves act like the sheath in a Bowden wire. Thus, the tabs must be precisely punched so that the diameters of the pathways are essentially the same as the diameters of the cable. As a result, this arrangement not only suffers from the same problems noted above with respect to the use of metal tubes, it is also expensive to manufacture due to the low tolerances that must be maintained in the punching operation.

SUMMARY OF THE INVENTION

The present invention provides a sunroof mechanism for a vehicle having a roof and an opening therein. The sunroof mechanism comprises a pair of track members that is constructed to be mounted to the roof at side edge portions of the opening. Each of the track members has an elongated drive member receiving channel with a longitudinally extending opening. A sunroof panel assembly of a size to close the opening is movably received on the track assembly. The sunroof panel assembly is moveable with respect to the opening in the roof between an open position, wherein the panel member uncovers the opening and a closed position, wherein the panel member substantially closes the opening in the roof.

A rail assembly is coupled to the pair of track members at end portions thereof and extends therebetween. A pair of elongated flexible drive members are each coupled to the rail assembly and each extend to the drive member receiving channels. Each of the drive members have an end portion thereof connected to portions of the sunroof panel assembly extending through the longitudinally extending openings of the channels. A pair of tubular flexible guide sheaths has internal diameters that essentially correspond to external diameters of the drive members. The drive members are received within the sheaths such that the sheaths guide the drive members for axial movement therein. The drive member receiving channels also have internal diameters essentially that correspond to the external diameters of the drive members. The drive members are received within the channels such that the channels guide the drive members for axial movement therein.

A driving unit is coupled to the rail assembly and is operatively connected to each of the pair of flexible drive members such that operation of the driving unit drives the flexible drive members axially within the guide sheaths and the drive member receiving channels to move the sunroof panel in an opening direction towards the open position and in a closing direction towards the closed position.

The rail assembly comprises a plurality of mounting portions that define sheath receiving pathways. The guide sheaths are received within the sheath receiving pathways so as to mount the sheaths and the driving members therein to the rail assembly. The track members each also include a guide sheath receiving portion each open at one end to the drive member receiving channels and at an opposite end to the rail assembly. The guide sheath receiving portions are oversized relative to the channels. The guide sheaths have end portions thereof received in the guide sheath receiving portions in axially spaced relation from the drive member receiving channels. The axially spaced relation enables the guide sheaths to elongate axially due to thermal expansion.

Other objects, features, and advantages will become apparent from the following detailed description, the accompanying drawings, and the appended claims.

DETAILED DESCRIPTION OF EMBODIMENTS OF THE INVENTION

Figure 1:
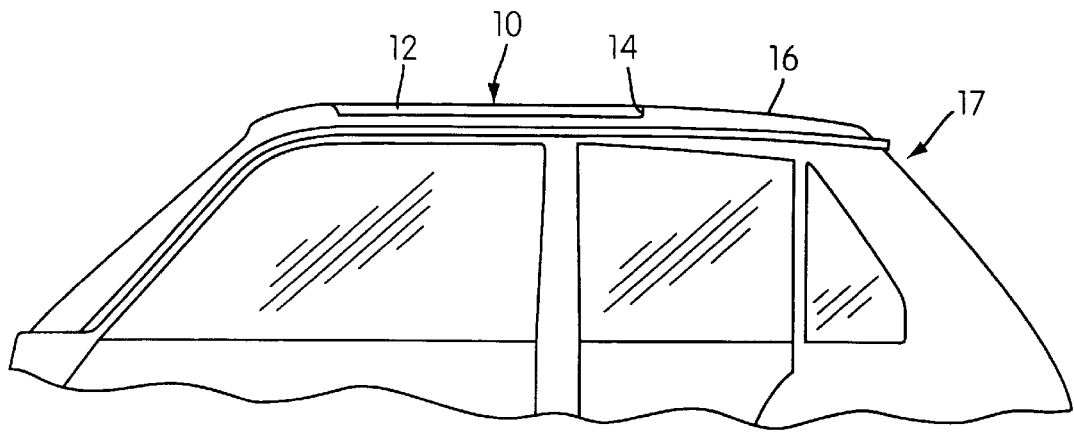
FIG. 1 is a side view of a vehicle with a sunroof mechanism according to the principles of the present invention in a closed position.
Figure 2:
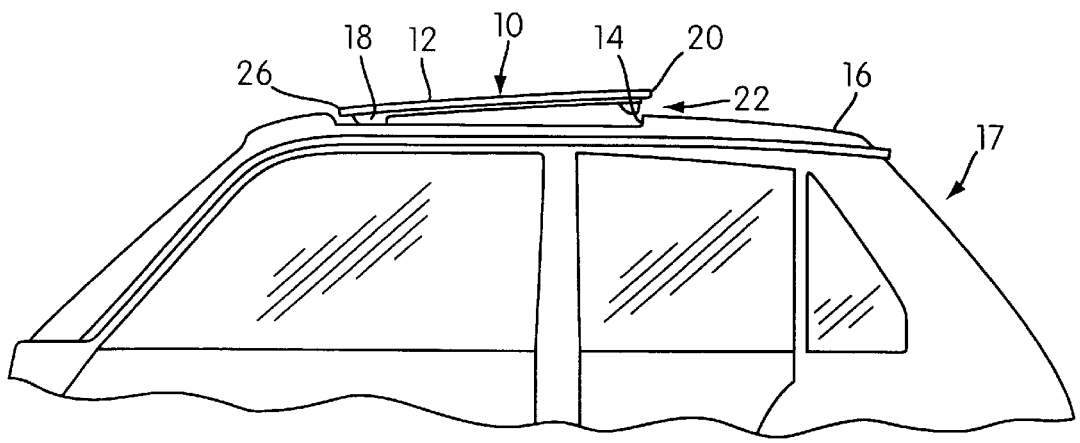
FIG. 2 is a side view of a vehicle with a sunroof mechanism according to the principles of the present invention in a vent position.
Figure 3:
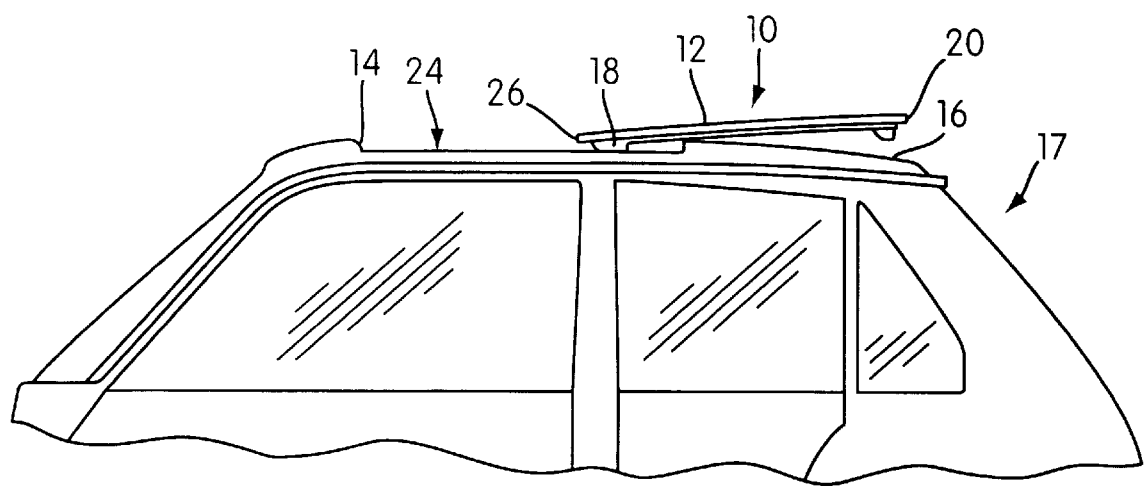
FIG. 3 is a side view of a vehicle with a sunroof mechanism according to the principles of the present invention in an open position.

FIGS. 1–4 illustrate a sunroof mechanism, indicated at 10, embodying principles of the present invention in various positions thereof. As shown in FIG. 1, the sunroof mechanism 10 includes a sunroof panel 12 of a size to cooperate with and substantially close a sunroof opening 14 within a roof 16 of a vehicle 17 when in a closed position relative to the opening 14. The sunroof panel assembly 12 is movably received on a track assembly in the form of a pair of track members 28 that extend in a longitudinal direction relative to the vehicle 17. The track members 28 are constructed to be mounted to the roof 16 at side edge portions of the opening 14. The sunroof panel 12 is movable with respect to the opening 14 in the roof 16 between a closed position (FIG. 1), a vent position (FIG. 2) and an open position (FIG. 3). A structural rail assembly, generally indicated at 19 (FIG. 4), is coupled to the pair of track members 28 at a forward edge portion of the opening 14.

In the closed position, an outer peripheral edge of the sunroof panel 12 is sealingly engaged with a cooperating interior peripheral edge of the sunroof opening 14 to thereby prevent water or air leakage therebetween. The peripheral edge of the sunroof panel 12 may optionally have attached thereto a gasket or other sealing element to facilitate the seal between the sunroof panel 12 and the roof 16. The interior peripheral edge of the sunroof opening 14 may also optionally include a gasket or other sealing element with which the outer peripheral edge of the sunroof panel 12 engages in sealing relation.

FIG. 2 shows the sunroof panel 12 in a vent position relative to the opening 14. As shown, a pair of lift arms 18 may be coupled between the sunroof panel 12 and the roof 16 and with the track members 28 to allow the sunroof panel 12 to be moved at an angle relative to the opening 14 between the vent and closed positions. In the vent position, the sunroof panel 12 is angled upwardly about its forward end portion 26 so that a rearward end portion 20 of the sunroof panel 12 is disposed above the roof 16 to define a vent opening 22 therebetween. The sunroof panel 12 may be angled in this manner relative to the roof 16, as shown in FIG. 2, so that during forward movement of the vehicle 17 the angled sunroof panel 12 effects a minimal amount of wind resistance.

FIG. 3 shows the sunroof panel 12 in an open position relative to the opening 14. As shown, in the open position, the sunroof panel 12 is displaced rearwardly relative to the opening 14 to define an open space 24 between a forward interior edge of the opening 14 and a forward end portion 26 of the sunroof panel 12. As also shown, the panel 12 is disposed at an angle relative to the opening 14, similarly as in the vent position shown in FIG. 2. In the open position of the sunroof panel 12, portions of the sunroof panel 12 and the lift arms 18 are disposed rearwardly of the opening 14 and in overlying relation relative to a rearward portion of the roof 16.

Figure 4:
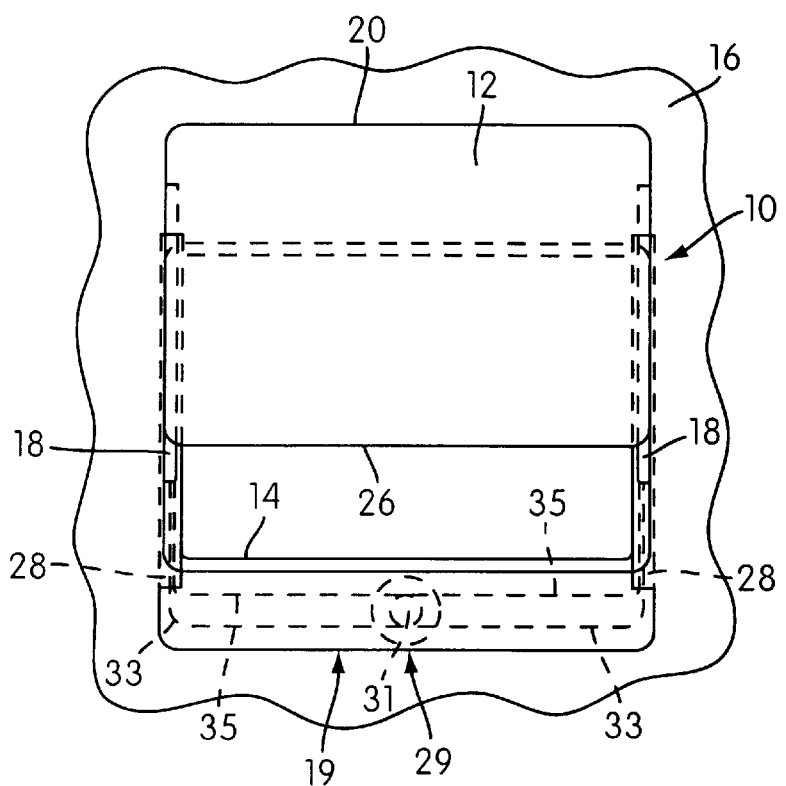
FIG. 4 is a schematic top view of the sunroof mechanism shown in FIGS. 1–3 having a structural rail supporting drive cables that are secured to associated track members of the sunroof mechanism.

FIG. 4 schematically shows the sunroof panel 12 in a partially open position relative to the opening 14, such as between the vent position and the open position thereof. As shown, a pair of the lift arms 18 are connected at opposing lateral sides of the sunroof panel 12 and are coupled to track members 28, which are connected to the roof 16 adjacent opposing lateral edges of the opening 14. The lift arms 18 may be pivotally and slidably mounted within track portions of the track members 28.

Figure 11:
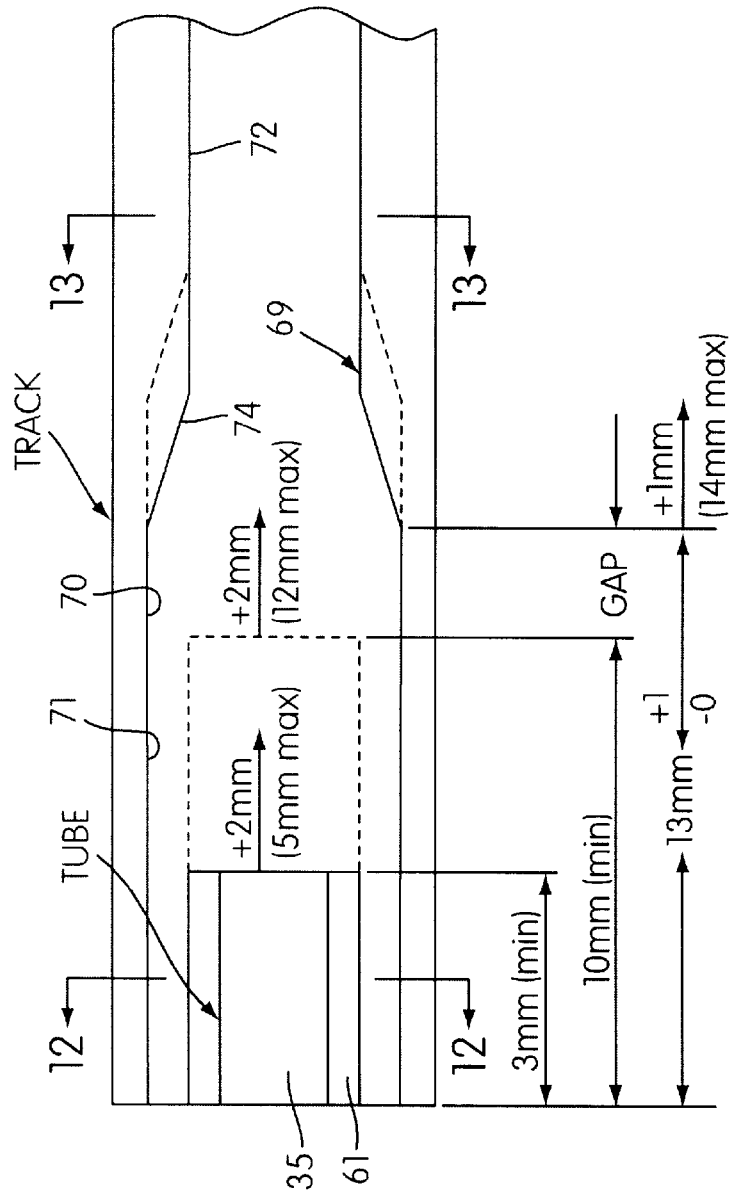
FIG. 11 is a side view of one drive cable and an associated track member shown in FIG. 4.
Figure 12:
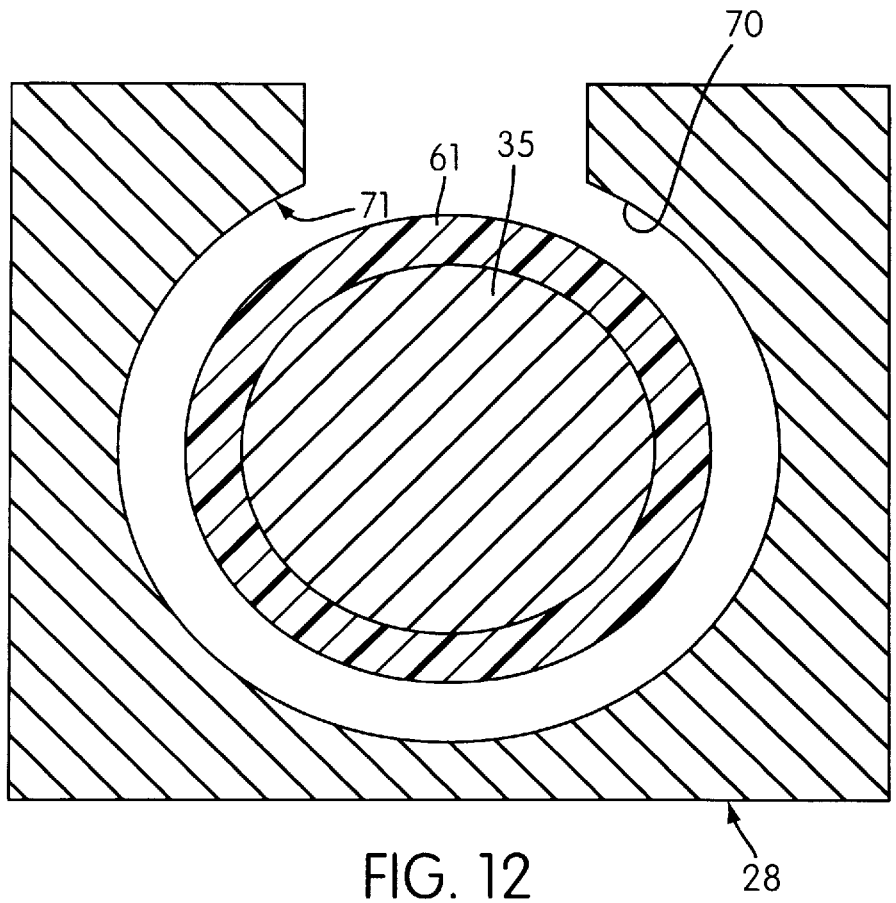
FIG. 12 is a cross-sectional view taken through line 12–12 of FIG. 11.
Figure 13:
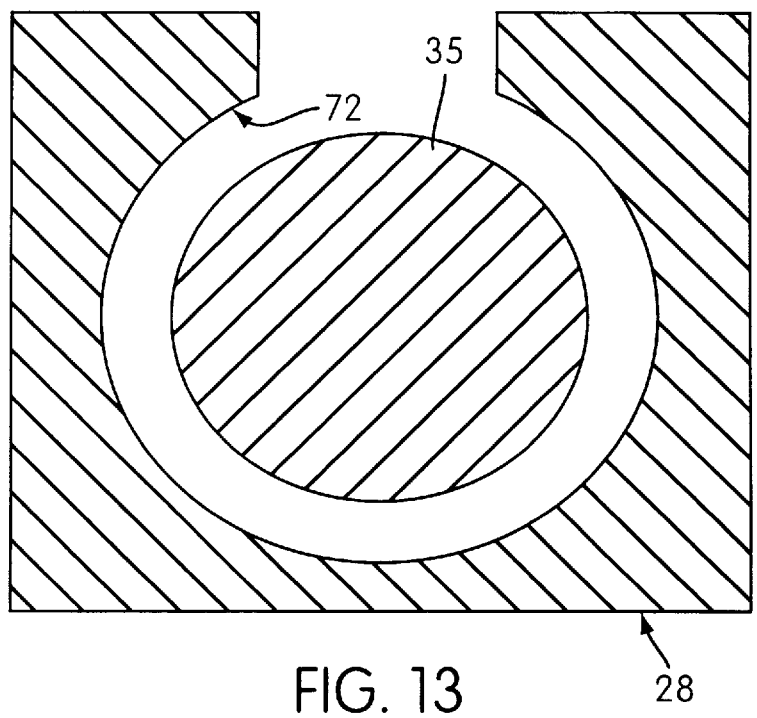
FIG. 13 is a cross-sectional view taken through line 13–13 of FIG. 11.

FIG. 4 also illustrates a drive mechanism 29 mounted on the structural rail 19 and coupled to the lift arms 18 to effect movement of the sunroof panel 12 between the closed, vent, and open positions. The drive mechanism 29 may include a driving unit 31 (e.g., a power operated device, such as a DC motor, or a hand operated device, such as a hand crank) that is drivingly coupled with the lift arms 18 with, for example, flexible drive cables 33, 35. The drive cables 33, 35 received within elongated drive member receiving channels 69 in the track members 28. The drive cables 33, 35 each have one end thereof connected to a portion of the sunroof assembly that extends through openings of the channels 72, e.g., the lift arms 18, to effect the driving coupling (FIGS. 11–13 show the drive cable 35 interfaced with the one channel 72). The drive cables 33, 35 constitute a pair of elongated flexible drive members that are configured to move the sunroof panel 12 into the various positions shown in FIGS. 1–4, as will be described below in greater detail.

The slide and tilt type sunroof mechanism 10 is shown for illustrative purposes only and the invention may be applied to any type of sunroof mechanism. For example, the invention may be applied to a conventional sliding sunroof that has no lifter arms to provide tilting.

By operating the driving unit 31, a user may effect movement of the sunroof panel 12 into the various positions thereof. The drive mechanism 29 may be of conventional design and may be mounted on the structural rail 19, as will be described in greater detail below. The driving unit 31 may be an electric motor, for example, that is activated by an automatic one-touch switch or a manual switch proximate the interior of the vehicle 17. Alternatively, a remote control device could activate the motor.

Figure 5:
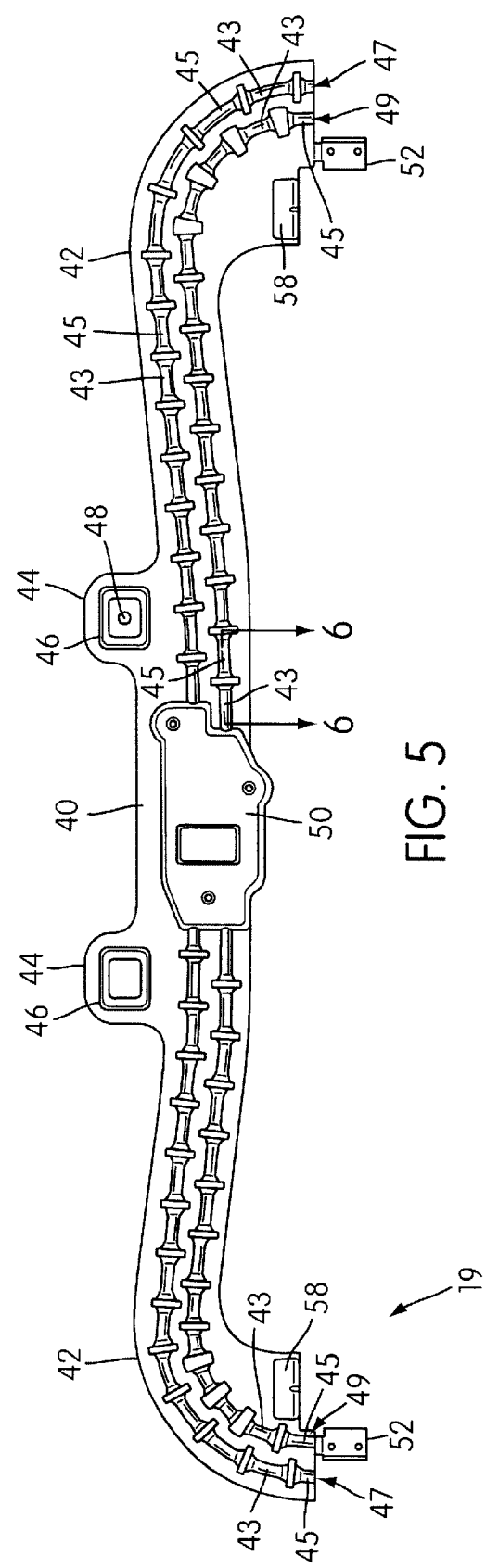
FIG. 5 is a top view of the structural rail shown in FIG. 4.

FIGS. 5–9 show the structural rail 19 in greater detail. As best seen in FIG. 5, the structural rail 19 is generally of a U-shaped construction. The structural rail 19 may be constructed from a composite material, such as plastic, metal or some other sufficiently rigid material includes a central section 40 integrally connected with two end sections 42 at opposite sides thereof. The central section 40 and the two end sections 42 each include a plurality of mounting portions 43, 45 configured to cooperatively provide separate pathways 47, 49 through which the respective drive cables 33, 35 and outer sheaths 61, which surrounded each drive cable 33, 35, are movably received.

Each mounting portion 43, 45, which may be formed of plastic, metal or some other sufficiently rigid material, may be slightly spaced from other mounting portions so that a small gap can be formed therebetween. This small gap, along with the predetermined angles $\theta_1$ and $\theta_2$, help facilitate insertion of the outer sheaths 61 through the mounting portions 43, 45 during an insertion process.

The pathway 47 extends along an outer peripheral portion of the structural rail 19 and the pathway 49 extends along the inner peripheral portion of the structural rail 19. The pathways 47, 49 are configured to allow expansion and contraction of the drive cables 33, 35 and their sheaths 61 while maintaining a constant centerline 55 for movement of the drive cables 33, 35 to effect movement of the sunroof panel 12, as will be described in further detail below in reference to FIGS. 6–11.

Figure 6:
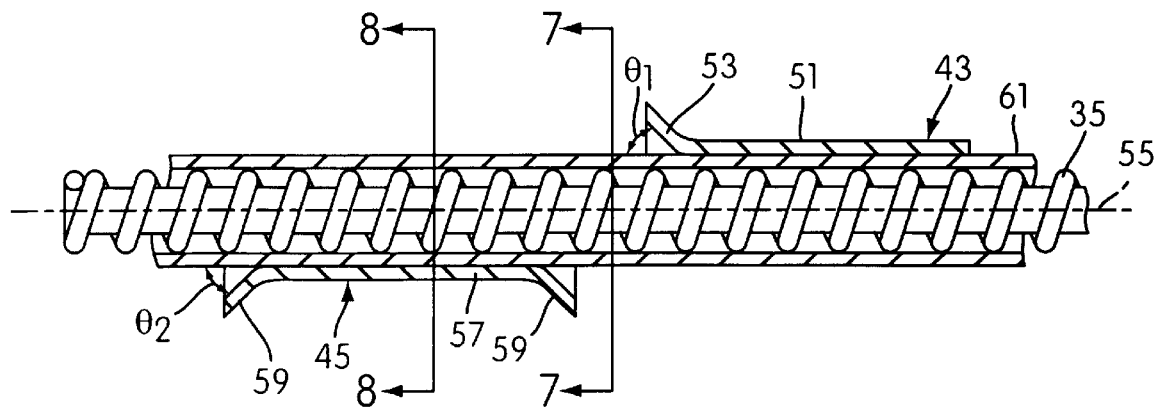
FIG. 6 is a cross-sectional view of the structural rail taken along the line 6–6 in FIG. 5.
Figure 7:
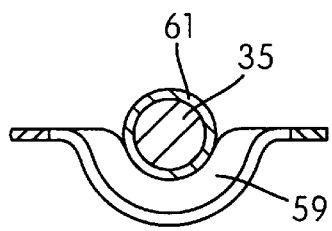
FIG. 7 is a cross sectional view of the structural rail taken along the line 7–7 in FIG. 6.
Figure 8:
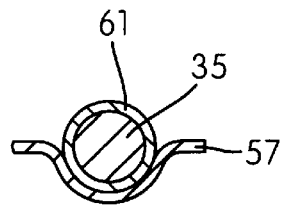
FIG. 8 is a cross sectional view of the structural rail taken along the line 8–8 in FIG. 6.

FIGS. 6–8 show views of the spaced mounting portions 43, 45 of the structural rail 19 in greater detail. Only pathway 49, through which drive cable 35 extends, is illustrated. A description of the pathway 49 will provide an understanding of the pathway 47 since both the pathways 47, 49 are of substantially identical construction and operation.

A plurality of the mounting portions 43, 45 aligned in series forms the pathway 49, which has a cross-sectional shape that is formed to complement the cross-sectional shape of the drive cable 35 (FIGS. 7–8). The mounting portions 43, 45 are of identical configuration and operation and may be integrally formed in the structural rail 19 by molding, punching or stamping, for example, although other manufacturing processes could be used as well.

The mounting portions 43 are substantially arcuate projections that extend upwardly from the structural rail 19 while the mounting portions 45 are substantially arcuate projections that extend downwardly from the structural rail 19. The mounting portions 43, 45 are aligned in a series in which the plurality of upwardly extending projections 43 and the plurality of downwardly extending projections 45 alternate in the series for each pathway 47, 49.

The mounting portion 43 includes an elongated central portion 51 and flared end portions 53 extending from the opposite ends of the central portion 51. The elongated central portion 51 is substantially parallel to the centerline 55 of the drive cable 35 and its sheath 61. The flared end portions 53 extend from the central portion 51 at a predetermined angle $\theta_1$ with respect to the elongated center portion 51. Similarly, the mounting portion 45 includes an elongated central portion 57 and flared end portions 59 extending from the opposite ends of the central portion 57. The elongated central portion 57 is substantially parallel to the centerline 55 of the drive cable 35. The flared end portions 59 extend from the central portion 57 at a predetermined angle $\theta_2$ with respect to the elongated center portion 57. The flared end portions 53 are angled upward with respect to the elongated center portion 51 by substantially the same angle as the flared end portions 59 are angled downward with respect to the elongated center portion 57. For example, the predetermined angles $\theta_1$ and $\theta_2$ can be any angle in the range of 0° to 90° and thus, the flared end portions 53, 59 could be angled (either upward or downward) at 0° to 90° from the respective center portions 51, 57. The flared end portions 53, 59 allow for easy insertion of the outer sheaths 61 into the pathway 49 and also reduce the possibility of damaging the drive cables 33, 35 and their outer sheaths 61 during the insertion process. Specifically, the flared end portions 53, 59 help guide the sheaths 61 and also keep the edges of the mounting portions 43, 45 out of contact with the sheaths 61 during operation.

As illustrated in FIGS. 6–8, the drive cable 35 is surrounded by the sheath 61, which may be formed of plastic or some other sufficiently flexible and/or resilient material. The sheath 61 engages the central sections 51, 57 of the mounting portions 43, 45 when the drive cable 35 extends through the pathway 49. The sheath 61 protects the drive cable 35 from wear and prevents the drive cable 35 from rubbing against the mounting portions 43, 45 of the structural rail 19 as the drive cable 35 passes through the sheath 61. The pathways 47, 49 defined by the mounting portions 43, 45 are oversized relative to the external diameters of the outer sheaths 61.

The sheath 61 has an internal diameter essentially corresponding to an external diameter of the cable 35. The cable 35 is received within the sheath 61 such that the sheath 61 guides the cable 35 for axial movement therein. Thus, the sheath 61 and the cable 35 act much like a Bowden wire. The end portion of the sheath 61 adjacent the driving unit 31 is fixed so that the sheath 61 does not travel axially with the cable 35 during operation. An identical sheath 61 is also used for the cable 33.

Figure 9:
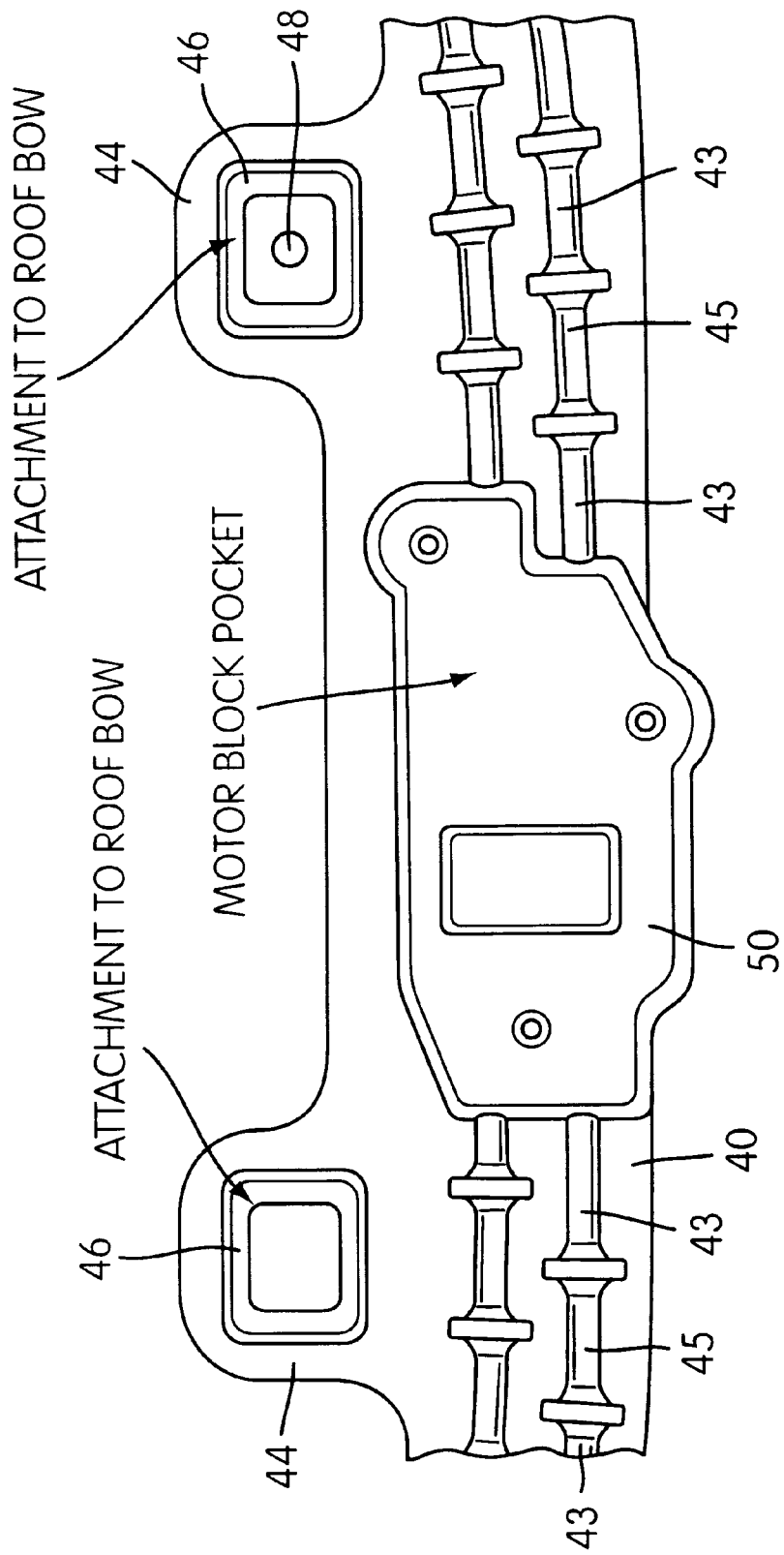
FIG. 9 is an enlarged top view of a central section of the structural rail shown FIGS. 4 and 5.

FIG. 9 shows the central section 40 of the structural rail 19 in greater detail. The central section 40 includes mounting structure, in the form of a pair of mounting flanges 44, for mounting the structural rail 19 to the vehicle roof 16. The mounting flanges 44 have a raised portion 46 having a substantially box configuration for mounting to the vehicle roof 16, for example, to the bow of the roof. Fasteners, such as screws or nuts and bolts, for example, may be used to secure the structural rail 19 to the vehicle roof 16. One or more fastener receiving openings 48 capable of receiving such fasteners may extend through the center of each mounting flange 44 (only one opening 48 is shown in FIG. 5) to effect the mounting.

The central section 40 further includes a driving mechanism mounting portion 50 for mounting the driving mechanism 29 and the driving unit 31, for example. The driving mechanism mounting portion 50 may be in the form of an enclosure integrally extending from the central section 40 to receive the driving mechanism 29 and the driving unit 31. The driving cables 33, 35 extend through openings in the driving mechanism mounting portion 50 to couple with the driving mechanism 29 and the driving unit 31.

The driving unit 31 is operatively connected to each of the cables 33, 35 to drive them axially within their sheaths 61. Since the opposing ends of the cables 33, 35 are connected to the sunroof panel 12 via the lift arms 18, axial movement of the cables 33, 35 within the sheaths 61 moves the panel 12 in the opening direction towards the vent position of FIG. 2 and then the open position of FIG. 3. Reversing this axial movement of the cables 33, 35 moves the panel 12 in the closing direction back to the vent position of FIG. 2 and then back to the closed position of FIG. 1.

In the illustrated embodiment, the cables 33, 35 are of the helical type and intermesh with a gear (not shown) driven by the driving unit 31. The gear drives the cables 33, 35 opposite one another in the central section 40 of the rail assembly 19 so that they move together in union in the end sections 42.

Figure 10:
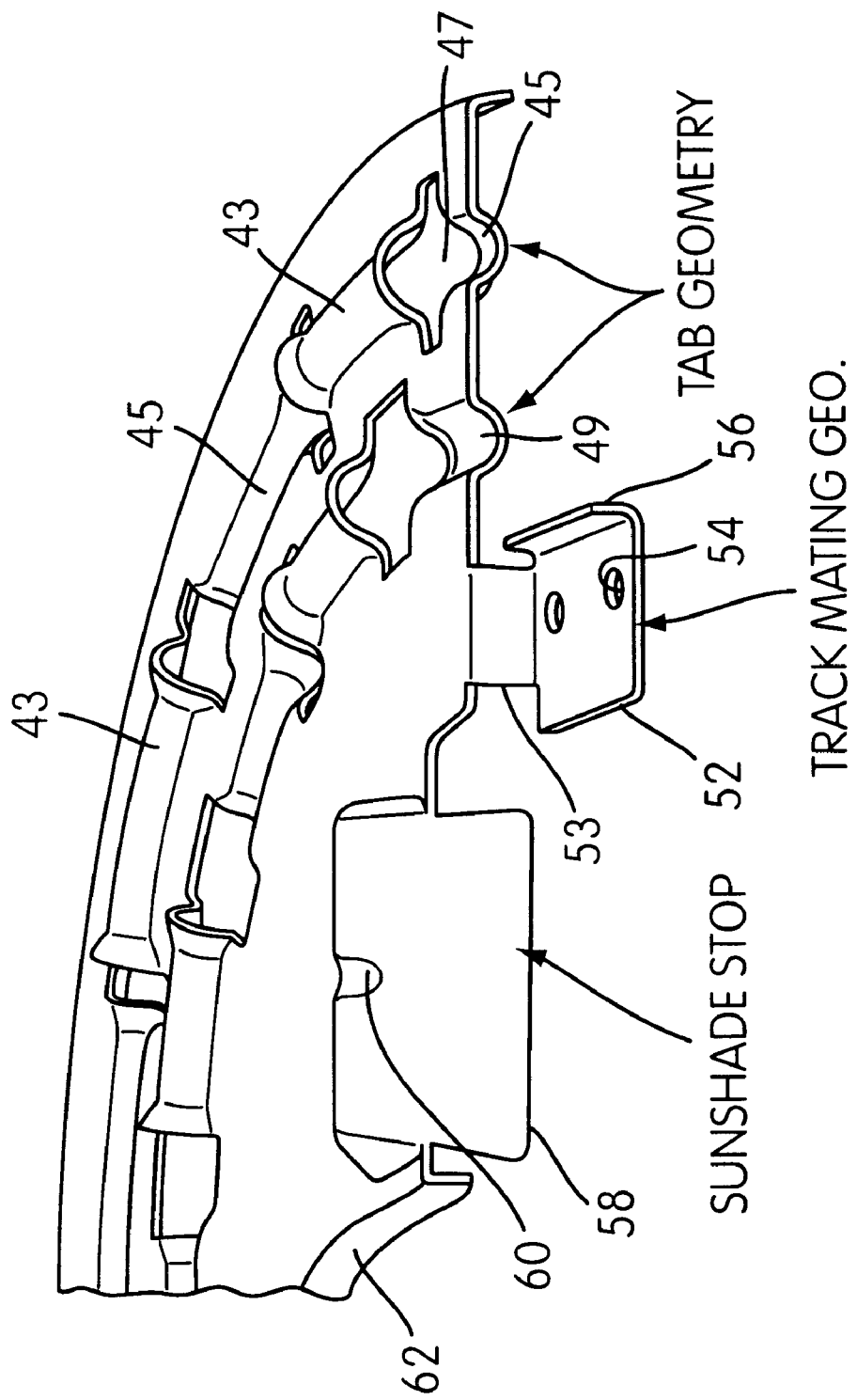
FIG. 10 is an enlarged perspective view of one end section of the structural rail shown in FIGS. 4 and 5.

FIG. 10 shows one of the end sections 42 (the right side end section in FIG. 5) of the structural rail 19 in greater detail. The other end section 42 has a mirror image construction. Each end section 42 includes a track member mating portion 52, which is configured to locate and mate with an associated track member 28. The track member mating portions 52 are connected to the end sections 42 by connecting portions 53, which extend downwardly so that the track member mating portions 52 are positioned at a lower height than the structural rail 19. The height difference allows the track members 28 to be secured to the end sections 42 of the structural rail 19 so that the track members 28 and the end sections 42 are substantially the same height (e.g., substantially level with one another).

The track member mating portions 52 may include one or more openings 54 to receive fasteners, such as screws and nuts and bolts, for example, therethrough to secure the track member mating portions 52 to the track members 28. The track member mating portions 52 may have an upwardly extending flange portion 56 on a peripheral edge thereof that engages the associated track member 28 and helps locate the same with respect to the associated track member mating portion 52.

Each end section 42 may also include a sunshade stop 58 positioned between the central section 40 and the track member mating portion 52. The sunshade stop 58 has an angled surface 60 that is configured to abut a sunshade (not shown) associated with the sunroof mechanism 10 to stop movement of the sunshade. The sunshade would be provided inside the vehicle 17 to cover the opening 14 and the sunroof panel 12 in a closed position thereof when the sunroof panel 12 is in its closed position. The angled surface 60 is sloped toward the opening 14 and has a recessed portion 62 in a middle portion thereof to stop movement of the sunshade. The provision of a sunshade stop is not essential and should not be considered limiting.

FIG. 11 shows an exaggerated side view of an interface between one drive cable 35 and an associated track member 28 and FIGS. 12 and 13 show an exaggerated cross-sectional views of the same interface. As illustrated, the interface is provided by a bore 69 including a guide sheath receiving portion 71, a tapered portion 74 and the elongated drive member receiving channel 72. As illustrated, the bore 69 is configured to receive the sheath 61 and the drive cable 35 therein. Specifically, the guide sheath receiving portion 71 has an internal diameter, essentially corresponding to the outer diameter of the guide sheath 61. The channel 72 has an internal diameter essentially corresponding to the outer diameter of the drive member 35. The sheath 61 and the channel 72 each guide the drive member 35 for axial movement therein. The guide sheath receiving portion 71 has an end portion 70 having a width greater than a width of the drive cable 35 and the sheath 61. The channel 72 is narrower than the end portion 70 of the guide sheath receiving portion and extends for the remainder of the bore 69. The guide sheaths 61 extend axially into the guide sheath receiving portion 71 to an extent such that the guide sheath 61 is not withdrawn from the guide sheath receiving portion 71 due to thermal shrinkage of the guide sheath 61 occurring at predetermined temperatures, e.g., −60° C. or below, as described in greater detail below.

As mentioned above, the channel 72 has a diameter substantially equal to a diameter of the drive cable 35, i.e., the channel 72 has an internal diameter essentially corresponding to the outer diameter of the drive member 35. The cable 35 extends outwardly from the sheath 61 into the channel 72 and is connected to the associated lift arm therein. Driving the cable 35 by the driving unit 31 thus moves the portion of the cable 35 extending from sheath 61 axially within the channel 72 to effect movement of the sunroof panel 12. Thus, the channel 72 of the bore 69 acts much like the sheath 61 in that it limits cable movement to axial driving movement. A tapered portion 74 separates the end portion 70 of the guide sheath receiving portion 71 from the channel 72 and has a width that gradually decreases from the width of the end portion 70 to the width of the channel 72. The guide sheath receiving portion 71 is oversized relative to the channel 72. An essentially identical interface is provided on the other track member 28 for the cable 33.

The tapered portion 74 is positioned a certain distance from the end portion 70 so that the drive cable 35 and its sheath 61 can move axially between the end portion 70 and the tapered portion 74 without adversely affecting the operation of the sunroof mechanism, e.g., by axially moving within the track member 28. For example, the sheath 61 has an end portion 73 thereof received in the end portion 70 of the guide sheath receiving portion 71 in axially spaced relation from the channel 72. The axially spaced relation enables the guide sheaths 61 to elongate axially due to thermal expansion without axially abutting portions of the track member 28, e.g., the tapered portion 74, at up to a predetermined temperature.

Specifically, as the cables 33, 35 and their sheaths 61 axially elongate during a temperature increase, a gap (FIG. 11) accommodates the cables' and the sheaths' expansion. If this axial expansion were not accommodated for, the axial elongation of the cables 33, 35 and their sheath 61 can apply a force on the driving unit 31 tending to backdrive it, or it can become placed in compression against the sunroof panel 12, which can cause the sheaths to buckle and move off their respective centerlines. This can be problematic in systems wherein sensors are used to detect sunroof panel 12 position directly or indirectly through measuring cable travel (e.g., counting motor revolutions to determine sunroof movement).

FIG. 11 shows the drive cable 35 and the sheath 61 positioned in the end portion 70 and extending to a middle portion of the end portion 70. During thermal cycling or other temperature changes, however, the drive cable 35 and the sheath 61 have a tendency to axially expand or contract along a centerline by certain amounts based on the thermal cycling or other temperature changes. The end portion 70 maintains the drive cable 35 and the sheath 61 along the centerline while accommodating some of this axial expansion in the same manner as the mounting portions 43, 45. Further, the interior configuration of the bore 69 including the guide sheath receiving portion 71, the drive member receiving channel 72 and the tapered portion 74 is constructed to allow limited axial expansion and axial contraction of the sheath 61. Specifically, the sheath 61 can expand axially within the end portion 70 so that it introduces the cable 35 to the drive member receiving channel 72 in a relatively centered fashion.

For example, the drive cable 35 and the sheath 61 extend a certain distance (e.g., about 6 millimeters) within the end portion 70 of the track member 28 in an initial or normal position (not expanded or contracted) thereof, which for purposes of reference has been selected at 24° C. Since the end portion 70 is approximately 13–14 millimeters in length, a gap (of about 7–8 millimeters) is formed between the sheath 61 and the drive member receiving channel 72 and the tapered portion 74 at this temperature. The gap ensures that the drive cable 35 and its sheath 61 can axially expand or contract along a centerline without axially abutting portions of the track members and thus, will not adversely affect the operation of the sunroof mechanism 10 or the track members 28. Specifically, as the cables 33, 35 and their sheaths 61 axially elongate during a temperature increase, the gap accommodates the cables' and the sheaths' expansion. If this axial expansion were not accommodated for, the axial elongation of the cables 33,35 and their sheath 61 can apply a force on the driving unit 31 tending to backdrive it, or it can become placed in compression against the sunroof panel 12 and bucketed off its centerline. This can be problematic in systems wherein sensors are used to detect sunroof panel 12 position directly or indirectly through measuring cable travel (e.g., counting motor revolutions to determine sunroof movement).

However, when the drive cable 35 and the sheath 61 are subjected to lower temperatures (e.g., temperatures ranging from −30° C. to 24° C.), a maximum gap length of 11 millimeters can be achieved. In the illustrated embodiment, At −30° C., for example, the sheath 61 contracts so that the sheath 61 only extends about 3 millimeters within the end portion 70. Since the length of the end portion 70 can be 14 millimeters, the maximum gap length, in this example, can be 11 millimeters. The gap ensures that expansion of the sheath 61 will not adversely affect the operation of the sunroof mechanism 10 or the track members 28.

When the drive cable 35 and the sheath 61 are subjected to higher temperatures (e.g., temperatures ranging from 24° C. to 85° C.) than discussed above, a minimum gap length of 1 millimeter can be achieved. In this temperature range, the sheath 61 can expand to extend about 10–12 millimeters within the end portion 70. Since the length of the end portion 70 can be 13 millimeters, the minimum gap length in this example can be 1 millimeter. Thus, the gap ensures that expansion of the sheath 61 will not adversely affect the operation of the sunroof mechanism 10 or the track members 28.

In general, the axially spaced relation enables the guide sheaths 61 to elongate axially due to thermal expansion without axially abutting portions of the track members 28 at up to a predetermined temperature, which may be up to 200° C. or more. Also, the guide sheaths 61 generally extend axially into the guide sheath receiving portions 71 to an extent such that the guide sheaths 61 are not withdrawn from the guide sheath receiving portions 71 due to thermal shrinkage of the guide sheaths 61 occurring at another predetermined temperature, which may be −60° C. or below. Guide sheaths of different materials, e.g., materials having a lower or higher coefficient of thermal expansion than the guide sheaths 61, may be used in temperatures below −60° C. or temperatures above 200° C., for example.

Guide sheaths of different materials generally expand or shrink at different rates for a predetermined temperature. In this case, the size of the gap provided between the sheath 61 and the drive member receiving channel 72 and the tapered portion 74 could be selected to be different lengths for the predetermined temperature. For example, in temperatures −60° C. or below, the gap could be smaller than shown in FIG. 11 and in temperatures of 200° C. or more, the gap could be larger than shown in FIG. 11.

Conceptually, a gap of a certain size is provided to ensure that expansion or contraction of the sheath 61 will not adversely affect the operation of the sunroof mechanism 10 or the track members 28. The gap's size is based on the expansion and the contraction of the guide sheaths 61, which at least partially depends on the material used to make those guide sheaths 61 and the temperature at which they are subjected. The gap size and the guide sheath material can be selected for applications in a certain temperature or temperature range.

Figure 14:
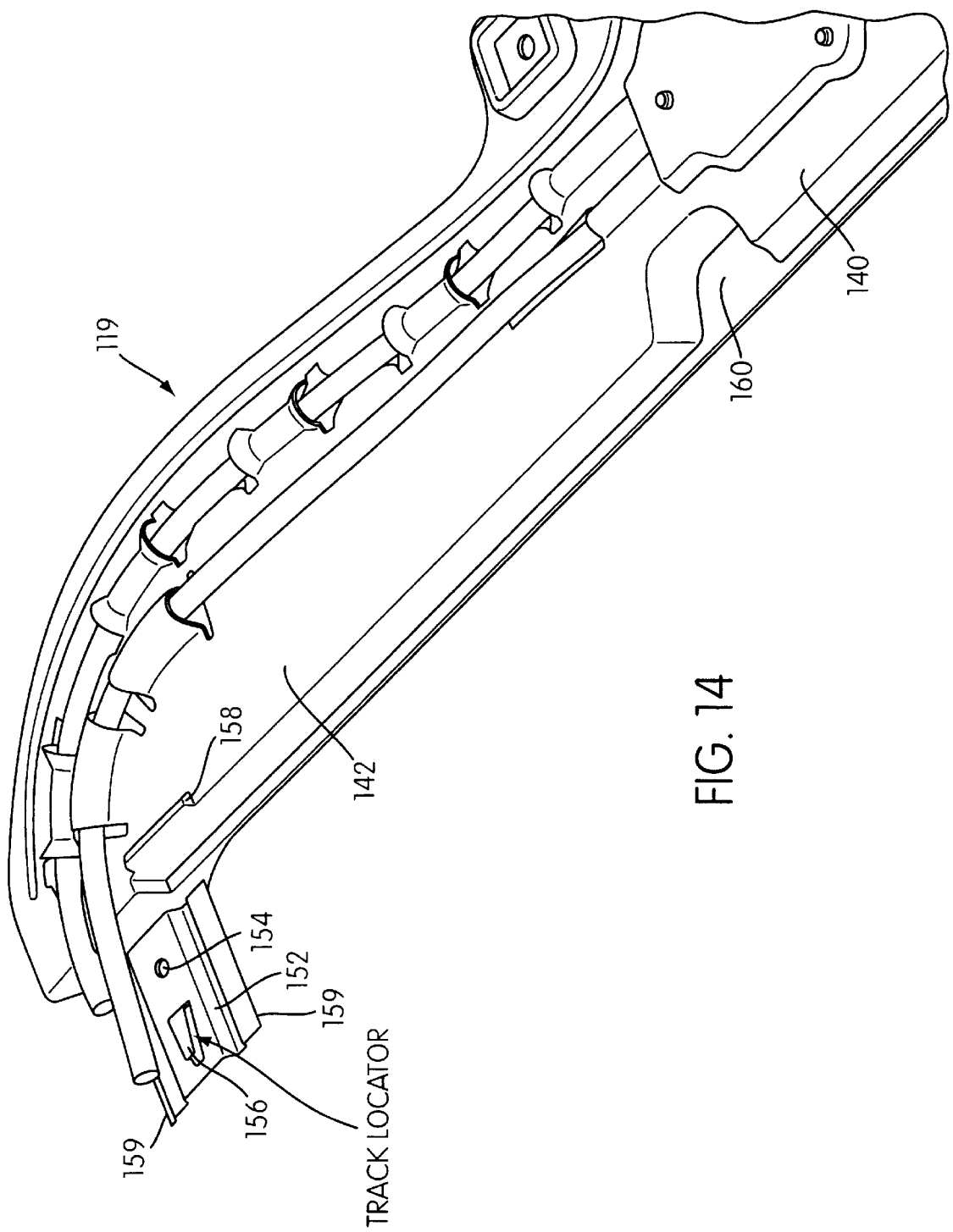
FIG. 14 is an enlarged perspective view of one end section of an alternative structural rail in accordance with the principles of the present invention.

Alternatively, FIG. 14 shows a central section 140 and an end section 142 of a structural rail 119. The structural rail 119 is an alternative configuration of the structural rail 19 shown in FIGS. 1–9. The structural rail 119 includes a track member mounting portion 152, which is an alternative configuration of the track member mounting portion 52 shown in FIG. 10. The track member mounting portion 152 could be provided on each end section 142 and could include a raised flange portion 156, which extends toward an associated track member 28, instead of the upwardly extending flange portion 56 shown in FIG. 10. One or more openings 154 could be provided in each track member mounting portion 152 for receiving one or more fasteners to secure the track member mounting portion 152 to an associated track members 28. The track member mating portions 152 could also include peripheral flange portions 159, which cooperate with the raised flange portion 156 to help locate the same with respect to the associated track member mating portion 152.

FIG. 14 also shows a sunshade stop 158, which is an alternative configuration of the sunshade stop 58 shown in FIG. 10, formed on each end section 142 of the structural rail 119. Each sunshade stop 158 is a raised portion having a generally rectangular shape that is configured to engage portions of the sunshade, when the sunshade is moved into a closed position, to stop movement thereof. A sunshade receiving portion 160 may be formed on the central section 140 of the structural rail and may have a generally U-shaped configuration, with the open end facing the opening 14. The recessed sunshade receiving portion could be configured to receive portions of a sunshade, when the sunshade is moved into a closed position, to stop movement thereof.

As aforesaid, the sunroof panel 12 of the sunroof mechanism 10 is capable of movement along a pair of track members 28 to various different operative positions. The driving mechanism 29 and electronics associated therewith drive the sunroof panel 12 to multiple positions, such as closed, open and vent.

Specifically, the driving mechanism 29 is operable to move the cables 33, 35 in a first direction, which in turn, moves the sunroof panel 12 into its open position. The driving unit 31 may be a worm gear, for example, that can be rotated by the driving mechanism 29 to effect movement of the cables 33, 35. The cables 33, 35 can be moved in a first direction so as to open the sunroof panel 12 by rotating the driving unit 31 (e.g., clockwise), either by electric power or manually, to engage a helical structure of the cables 33, 35. The driving unit 31 could be rotated in an opposite direction (e.g., counter-clockwise) to effect movement of the cables 33, 35 in a second direction so as to move the sunroof panel 12 into its closed position. The helical structure of the cables 33, 35 would be exposed (e.g., no sheath 61 in the driving mechanism mounting portion 50) so as to engage the driving unit 31. As discussed above, the drive cables 33, 35 could be secured to the lift arms 18 to effect driving coupling of the sunroof panel 12.

As the cables 33, 35 are moved in either the opening or closing direction, the cables 33, 35 pass through the sheath 61 and the associated pathway 47, 49 and are protected from wear and rubbing against one of the structural rails 19, 119. The pathways 47, 49 allow axial expansion and contraction of the cables 33, 35 while maintaining the constant centerline 55 for movement of the cables 33, 35 in the opening and closing directions thereof.

The foregoing detailed description has been provided to illustrate the structural and functional principles of the present invention and is not intended to be limiting. To the contrary, the present invention is intended to encompass all alterations, modifications, and substitutions within the spirit and scope of the following claims.

What is claimed is:

1. A sunroof mechanism for a vehicle having a roof and an opening therein, the sunroof mechanism comprising:
   a pair of track members constructed to be mounted to the roof at side edge portions of the opening, each of the track members having an elongated drive member receiving channel with a longitudinally extending opening;

a sunroof panel assembly of a size to close the opening, the panel assembly being movably received on the track assembly and moveable with respect to the opening in the roof between an open position, wherein the panel member uncovers the opening and a closed position, wherein the panel member substantially closes the opening in the roof;

a rail assembly coupled to the pair of track members at end portions thereof and extending therebetween;

a pair of elongated flexible drive members each coupled to the rail assembly and each extending to the drive member receiving channels, each of the drive members having an end portion thereof connected to portions of the sunroof panel assembly extending through the longitudinally extending openings of the channels;

a pair of tubular flexible guide sheaths having internal diameters essentially corresponding to external diameters of the drive members, the drive members being received within the sheaths such that the sheaths guide the drive members for axial movement therein;

the drive member receiving channels also having internal diameters essentially corresponding to the external diameters of the drive members, the drive members being received within the channels such that the channels guide the drive members for axial movement therein; and a driving unit coupled to the rail assembly and operatively connected to each of the pair of flexible drive members such that operation of the driving unit drives the flexible drive members axially within the guide sheaths and the drive member receiving channels to move the sunroof panel in an opening direction towards the open position and in a closing direction towards the closed position;

the rail assembly comprising a plurality of mounting portions defining sheath receiving pathways, the guide sheaths being received within the sheath receiving pathways so as to mount the sheaths and the driving members therein to the rail assembly;

the track members each also including guide sheath receiving portions each open at one end to the drive member receiving channels and at an opposite end to the rail assembly, the guide sheath receiving portions being oversized relative to the channels, the guide sheaths having end portions thereof received in the guide sheath receiving portions in axially spaced relation from the drive member receiving channels, the axially spaced relation enabling the guide sheaths to elongate axially due to thermal expansion.

2. A sunroof mechanism according to claim 1, wherein the axially spaced relation enables the guide sheaths to elongate axially due to thermal expansion without axially abutting portions of the track members at a predetermined temperature.

3. A sunroof mechanism according to claim 1, wherein the guide sheaths extend axially into the guide sheath receiving portions to an extent such that the guide sheaths are not withdrawn from the guide sheath receiving portions due to thermal shrinkage of the guide sheaths occurring at the predetermined temperature or below.

4. A sunroof mechanism according to claim 1, wherein the track members include tapered portions connecting the drive channels with the guide sheath receiving channels.

5. A sunroof mechanism as claimed in claim 1, wherein the sheath receiving pathways are oversized relative to the external diameters of the guide sheaths and are configured so as to allow the radial flexure of the outer sheaths and the cables therein.

6. A sunroof mechanism as claimed in claim 1, wherein the plurality of mounting portions include a plurality of upwardly extending projections and a plurality of downwardly extending projections.

7. A sunroof mechanism as claimed in claim 6, wherein the plurality of mounting portions are aligned in a series and wherein the plurality of upwardly extending projections and the plurality of downwardly extending projections alternate in the series.

8. A sunroof mechanism as claimed in claim 7, wherein the mounting portions are formed integrally with the rail assembly by a punching or stamping operation.

9. A sunroof mechanism as claimed in claim 7, wherein the mounting portions are formed integrally with the rail assembly by a molding operation.

10. A sunroof mechanism as claimed in claim 7, wherein the plurality of upwardly extending projections and the plurality of downwardly extending projections include an elongated central portion and a pair of flared end portions, the pair of flared end portions being disposed on opposite sides of the elongated central portion.

11. A sunroof mechanism as claimed in claim 10, wherein the flared end portions are angled at a predetermined angle with respect to the elongated central portion.

* * * * *